Figure 1:
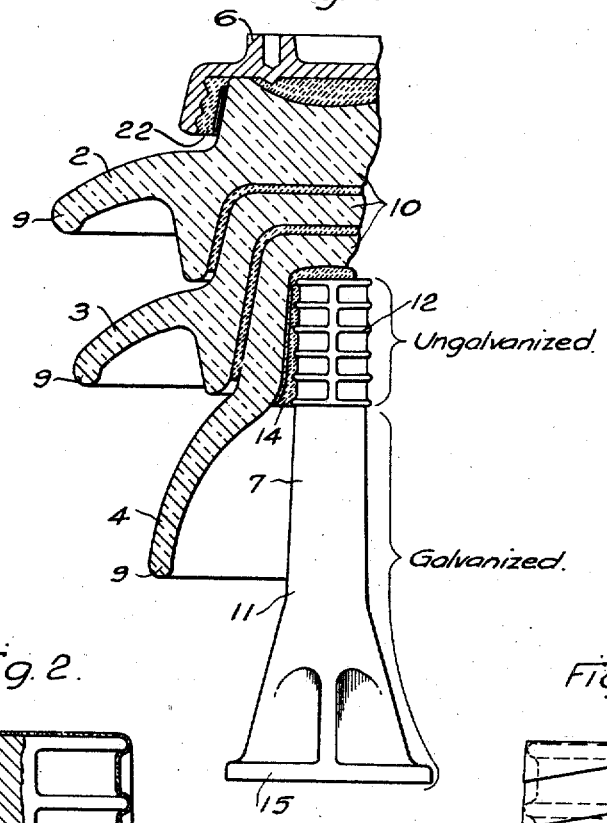

Dec. 4, 1928. W. K. NAYLOR Re. 17,150

INSULATOR STRUCTURE

Original Filed April 16, 1927

WITNESSES:
E. A. McCloskey.
F. H. Miller

INVENTOR
William K. Naylor.
BY
Wesley Clark
ATTORNEY

Reissued Dec. 4, 1928. Re. 17,150

UNITED STATES PATENT OFFICE.

WILLIAM K. NAYLOR, OF PITTSBURGH, PENNSYLVANIA, ASSIGNOR TO WESTINGHOUSE ELECTRIC & MANUFACTURING COMPANY, A CORPORATION OF PENNSYLVANIA.

INSULATOR STRUCTURE.

Original No. 1,673,582, dated June 12, 1928, Serial No. 184,223, filed April 16, 1927. Application for reissue filed August 23, 1928. Serial No. 301,669.

My invention relates to insulator structures and particularly to insulator structures of the pin-type.

One object of my invention is to provide a structure of the above-indicated character that shall compensate for deleterious effects occurring between constituent elements of the insulators as heretofore constructed.

Another object of my invention is to provide an insulator of the pin-type that shall have better holding cooperation between the insulator and the pin.

Another object of my invention is to provide an insulator of the pin-type in which the pin shall have holding surface portions and protective surface portions of different materials, whereby an improved structure is obtained.

A further object of my invention is to provide an insulator of the pin-type that shall be simple and durable in construction, economical to manufacture and effective in its operation. In insulators of the pin-type, in which the pins are cemented in permanently fixed relation to the insulating members, loosening of the pins, after some period of service and for no apparent cause, has caused considerable trouble and expense.

It has been found, in insulators employing galvanized-iron pins secured in position by neat Portland cement, or similar binder, that disintegration of the cement surfaces occurs next to the zinc coatings of the pins. This disintegration or breaking away of the cement from the zinc coatings is evidenced by fissures and hollowed-out areas in the cement surfaces which may be seen by breaking the insulators and removing them from the pins.

However, it is highly desirable that the exposed portions of the pins be protected against the weather and, particularly where iron pins are employed, galvanized zinc coatings have provided a desirable combination of economy, durability and effectiveness. It is my aim to eliminate the above-mentioned objectionable feature and to retain the desirable features of the coatings by selectively coating the pins on certain exposed surfaces thereof and leaving bare, or otherwise treating, the surfaces that cooperate with the cement.

Accordingly, in practicing a preferred form of my invention, I provide an iron pin in which the cemented end is to be left uncoated during the dipping of the pin in a zinc bath, by suitably covering said end, with a temporary coating that will not be affected by the zinc, and the remainder of the exposed pin surface being permitted to become galvanized or coated in the usual manner.

Figure 2:
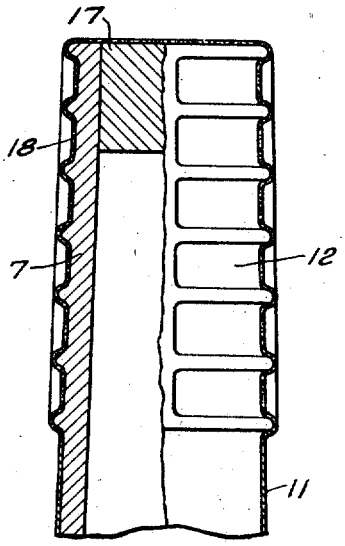
Figure 3:
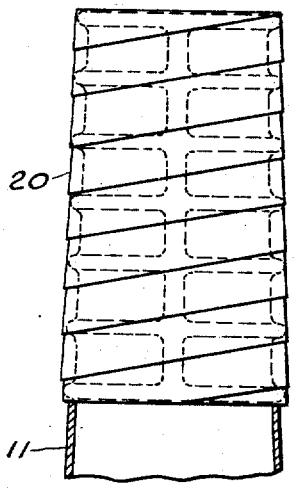

Figure 1 of the accompanying drawing is a side view, partially in section and partially in elevation, of a portion of an insulator structure of the pin-type constructed in accordance with my invention, Fig. 2 is an enlarged detail view of the upper portion of the pin, shown in Fig. 1, illustrating one step in the selective galvanizing process by the use of a temporary liquid coating, and Fig. 3 is a view, similar to Fig. 2, illustrating the same step in the selective galvanizing process by the use of a temporary mechanical covering.

Referring to Fig. 1, an insulator constructed in accordance with my invention may comprise, in general, a plurality of insulating parts or shells 2, 3 and 4, an upper terminal member 6 and a lower terminal member or pin 7.

The members 2, 3, and 4, preferably of refractory insulating material, such as porcelain or glass, are of usual form having surface-creepage flanges or petticoats 9 and inner portions 10 nested, one within another, and secured together by cement.

The upper terminal member 6 is preferably of metal and cemented to the upper shell 2.

The pin 7, preferably of iron and of tubular form, has a portion of its length, at its upper end 12, corrugated or otherwise constituted for holding cooperation with a body of cement 14. This portion of the pin is preferably left bare or ungalvanized so that the cement or other bonding material directly engages the material of the pin, although it may be otherwise treated for good holding cooperation with the cement or coated with material which does not interfere with such cooperation.

The outer pin surface, from the ungalvanized portion 12 to the lower end 15 thereof, is galvanized or similarly coated with a protective material, such as a zinc coating 11.

In selectively coating the pin 7, after it is received from the foundry, it is cleaned, in a usual manner, by subjecting it to a hydrochloric-acid bath and a shot-blast operation.

As illustrated in Fig. 2, the portion 12 of the pin may then be closed, as by a temporary plug 17 at its outer end, and coated, as indicated by a coating 18, with a body of sodium silicate. This material may be applied by dipping or by means of a brush and is allowed to dry in the form of a hard coating.

The portion of the pin, that is to be galvanized, is dipped in hydrochloric acid, preferably only up to the lower edge of the portion 12, but, if splashing occurs, or the pin is submerged, the sodium silicate is not affected.

The pin is next dipped in the galvanizing bath in a usual manner, during which operation, the water in the sodium silicate is driven off by the heat of the molten zinc. This operation causes the sodium silicate to swell to the form of a relatively thick layer of silicious material which prevents contact between the zinc and the pin.

The pin is dipped in water for cooling, after which the silicious coating is removed, as by brushing with a wire brush. The brushing operation is preferably performed in water to facilitate the removal of the silicious material.

If the process has been correctly performed, the uncorrugated portion of the pin will be perfectly galvanized by the coating 11, while the portion 12 will be clean and ungalvanized.

As illustrated in Fig. 3, a modified process contemplates the use of a mechanical structure coating in the place of the coating 18 of sodium silicate. Such a mechanical coating may comprise material, such as a body of tape 20, that has been treated with sodium silicate or otherwise so constituted as to be unaffected during immersion in the zinc bath.

The cap 6 is also subjected to the same treatment, the inner surface 22 being covered by the temporary coating to prevent engagement by the zinc when the outer surface is galvanized.

By my invention, a structure of very little increased cost, caused by the selective galvanizing, is obtained that provides more effective and permanent holding cooperation between the insulator and the cap and the pin, and protects the cap and the pin against the weather as effectively as the best insulators heretofore employed.

While I have shown and described a particular form of my invention, changes may be effected therein without departing from the spirit and scope thereof, as set forth in the appended claims.

I claim as my invention:

1. An insulator of the pin-type comprising an insulating member having a recess, and a pin cemented in position in the recess and having only its exposed surface galvanized.

2. An insulator of the pin-type comprising an insulating member having a recess, and a pin having a portion cemented in position in said recess and a portion projecting therefrom, the cement being directly associated with the material of which the pin is constructed and said projecting portion having a metal coating thereon.

3. An insulator of the pin-type comprising an insulating member having a recess, and an iron pin having a portion cemented in position in said recess and a portion projecting therefrom, the cement being directly associated with the iron of the pin and said projecting portion having a zinc coating thereon.

4. An insulator of the pin-type comprising an insulating member having a recess, and a metal pin having a portion of its length from one end thereof cemented in position in said recess and the remainder thereof outside the insulator, the cement being directly associated with the metal of which the pin is constructed and said outside portion having a galvanized coating of different metal thereon.

5. An insulator of the pin-type comprising an insulating member having a recess, an iron pin having a portion disposed in said recess and a portion outside the recess, a body of neat Portland cement or similar binder directly associated with the iron of the pin in the recess and a zinc coating on said outside portion of the pin.

6. An insulator of the pin-type comprising an insulating member having a recess, and a pin cemented in position in the recess having a galvanized portion and a portion of different character for holding cooperation with the cement.

7. An insulator comprising an insulating member and a supporting member therefor, one of said members having a recess and the other having a portion cemented in position in said recess and said supporting member having only its exposed surface coated with metal.

8. An insulator comprising an insulating member and a supporting member therefor, one of said members having a recess and the other having a portion bonded in position in said recess and said supporting member having only its exposed surface provided with a weather-protective coating.

9. An insulator comprising an insulating member and a member cooperating therewith, one of said members having a recess and the other having a portion cemented in position in said recess and said cooperating member having only its exposed surface coated with metal.

10. An insulator comprising an insulating member and a member cooperating therewith, one of said members having a recess and the other having a portion bonded in position in said recess and said cooperating member having only its exposed surface provided with a weather-protective coating.

In testimony whereof, I have hereunto subscribed my name this 17th day of August, 1928.

WILLIAM K. NAYLOR.